US012450748B1

(12) United States Patent
Jampani et al.

(10) Patent No.: US 12,450,748 B1
(45) Date of Patent: Oct. 21, 2025

(54) SEGMENTATION USING AN UNSUPERVISED NEURAL NETWORK TRAINING TECHNIQUE

(71) Applicant: NVIDIA Corporation, Santa Clara, CA (US)

(72) Inventors: Varun Jampani, Westford, MA (US); Wei-Chih Hung, Merced, CA (US); Sifei Liu, Santa Clara, CA (US); Pavlo Molchanov, Mountain View, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/223,348

(22) Filed: Jul. 18, 2023

Related U.S. Application Data

(63) Continuation of application No. 16/378,464, filed on Apr. 8, 2019, now Pat. No. 11,748,887.

(51) Int. Cl.
*G06V 10/00* (2022.01)
*G06F 17/15* (2006.01)
*G06F 18/40* (2023.01)
*G06N 3/045* (2023.01)
*G06N 3/047* (2023.01)
(Continued)

(52) U.S. Cl.
CPC ............... *G06T 7/11* (2017.01); *G06F 17/15* (2013.01); *G06F 18/40* (2023.01); *G06N 3/045* (2023.01); *G06N 3/047* (2023.01); *G06N 3/088* (2013.01); *G06T 7/143* (2017.01); *G06V 10/764* (2022.01); *G06V 10/82* (2022.01); *G06V 10/945* (2022.01); *G06V 20/41* (2022.01)

(58) Field of Classification Search
CPC ............ G06N 3/08; G06N 3/02; G06N 3/042; G06N 3/045; G06N 3/047; G06N 3/049; G06N 3/082; G06N 3/092; G06N 3/0475; G06N 3/0454; G06N 3/0464; G06V 10/82; G06V 10/761; G06V 10/764; G06V 10/945; G06V 20/41; G06T 7/11; G06T 7/143; G06F 18/40; G06F 17/15
See application file for complete search history.

(56) References Cited

U.S. PATENT DOCUMENTS

| 9,730,643 B2 | 8/2017 | Georgescu et al. |
| 10,636,141 B2 | 4/2020 | Zhou et al. |

(Continued)

FOREIGN PATENT DOCUMENTS

CN   107563422 A   1/2018

OTHER PUBLICATIONS

Pelagotti et al., "WO2002093488A2 Segmentation unit for and method of determining a second segment and image processing apparatus"; Publication Date: Nov. 21, 2002.*
(Continued)

*Primary Examiner* — Amir Alavi
(74) *Attorney, Agent, or Firm* — Robert C. Kowert; Kowert, Hood, Munyon, Rankin & Goetzel, P.C.

(57) ABSTRACT

Systems and methods to detect one or more segments of one or more objects within one or more images based, at least in part, on a neural network trained in an unsupervised manner to infer the one or more segments. Systems and methods to help train one or more neural networks to detect one or more segments of one or more objects within one or more images in an unsupervised manner.

17 Claims, 10 Drawing Sheets

(51) Int. Cl.
G06N 3/088 (2023.01)
G06T 7/11 (2017.01)
G06T 7/143 (2017.01)
G06V 10/764 (2022.01)
G06V 10/82 (2022.01)
G06V 10/94 (2022.01)
G06V 20/40 (2022.01)

(56) References Cited

U.S. PATENT DOCUMENTS

| | | | |
|---|---|---|---|
| 10,646,156 B1 | 5/2020 | Schnorr | |
| 10,671,855 B2 | 6/2020 | Lee et al. | |
| 10,672,129 B1 * | 6/2020 | Yoo | G06N 3/045 |
| 10,776,691 B1 | 9/2020 | Ghahramani et al. | |
| 10,782,691 B2 | 9/2020 | Suresh et al. | |
| 10,803,325 B2 | 10/2020 | Bai et al. | |
| 10,818,014 B2 * | 10/2020 | Xu | G06T 7/11 |
| 10,891,723 B1 | 1/2021 | Chung et al. | |
| 10,936,907 B2 | 3/2021 | Suresh et al. | |
| 10,937,200 B2 * | 3/2021 | Kumar | G06T 5/92 |
| 10,949,907 B1 * | 3/2021 | Jain | G06V 10/806 |
| 10,990,645 B1 | 4/2021 | Shi | |
| 11,003,945 B2 | 5/2021 | Adams et al. | |
| 11,348,246 B2 * | 5/2022 | Phogat | G06T 11/206 |
| 11,537,210 B2 * | 12/2022 | Baijal | G06T 7/90 |
| 11,587,234 B2 * | 2/2023 | Zhao | G06T 7/11 |
| 11,869,125 B2 * | 1/2024 | Bedi | G06T 11/60 |
| 11,972,569 B2 * | 4/2024 | Price | G06T 7/11 |
| 12,087,012 B2 * | 9/2024 | Dikhale | B25J 9/1694 |
| 2018/0085002 A1 * | 3/2018 | Glinec | A61C 9/0073 |
| 2018/0101768 A1 | 4/2018 | Laine | |
| 2020/0211674 A1 * | 7/2020 | Israeli | G16B 40/00 |
| 2020/0320401 A1 | 10/2020 | Jampani et al. | |

OTHER PUBLICATIONS

Wah et al. "The Caltech-ucsd birds-200-2011 Dataset", https://authors.library.caltech.edu/27452/1/CUB_200_2011.pdf, dated 2011, 8 pages.
Wang et al., "Semantic Part Segmentation using Compositional Model Combining Shape and Appearance," CVPR, 2015, 10 pages.
Xu et al., "Learning to Segment Under various Forms of Weak Supervision," 2015 IEEE Conference on Computer Vision and Pattern Recognition (CVPR), Jun. 7, 2015, 10 pages.
Yosinski et al., How Transferable are Features in Deep Neural Networks? NIPS, 2014, 9 pages.
Zagoruyko et al., "Learning to Compare Image Patches via Convolutional Neural Networks," CVPR, 2015, 9 pages.
Zbontar et al., "Computing the Stereo Matching Cost with a Convolutional Neural Network," CVPR, 2015, 8 pages.
Zbontar et al., "Stereo Matching by Training a Convolutional Neural Network to Compare Image Patches," Journal of Machine Learning Research, 2016, 32 pages.
Zeiler et al., "Visualizing and Understanding Convolutional Networks," European Conference on Computer Vision, 2014, 16 pages.
Zhang et al., "Facial Landmark Detection by Deep Multi-task Learning," ECCV, 2014, pp. 94-108.
Zhang et al., "Unsupervised Discovery of Object Landmarks as Structural Representations," CVPR, 2018, 10 pages.
Zhou et al., "Learning Deep Features for Discriminative Localization," Proceedings of the IEEE Conference on Computer Vision and Pattern Recognition, 2016, 9 pages.
Zhou et al., "Object Detectors Emerge in Deep Scene CNNs," ICLR, 2015, 12 pages.
Zhu et al., "Saliency Optimization from Robust Background Detection," CVPR, 2014, 8 pages.
Zuffi et al., "The Stitched Puppet: A Graphical Model of 3D Human Shape and Pose," CVPR, 2015, 10 pages.
Agrawal et al., "Analyzing the Performance of Multilayer Neural Networks for Object Recognition," ECCV, 2014, 21 pages.
Article 67(3) EPC Communication mailed Sep. 16, 2020, European Patent Application No. 20167216.9, 2 pages.
Azizpour et al., "Object Detection Using Strongly-Supervised Deformable Part Models," ECCV, 2012, 14 pages.
Bau et al., "Network Dissection: Quantifying Interpretability of Deep Visual Representations," CVPR, Apr. 19, 2017, 9 pages.
Bourdev et al., "Poselets: Body Part Detectors Trained Using 3D Human Pose Annotations," ICCV, 2009, 8 pages.
Branson et al., "Strong Supervision From Weak Annotation: Interactive Training of Deformable Part Models," ICCV, 2011, 8 pages.
Bristow et al., "Dense Semantic Correspondence Where Every Pixel is a Classifier," ICCV, May 15, 2015, 8 pages.
Chang et al., "From Co-Saliency to Co-Segmentation: An Efficient and Fully Unsupervised Energy Minimization Model," CVPR, 2011, 8 pages.
Chen et al., "Deeplab: Semantic Image Segmentation with Deep Convolutional Nets, Atrous Convolution, and Fully Connected CRFS," IEEE transactions on pattern analysis and machine intelligence, 40(4):, May 12, 2017, 14 pages.
Chen et al., "Detect What You Can: Detecting and Representing Objects Using Holistic Models and Body Parts," CVPR, 2014, 8 pages.
Collins et al., "Deep Feature Factorization For Concept Discovery," The European Conference on Computer Vision (ECCV '18), Sep. 8, 2018, 17 pages.
Communication Pursuant to Rule 69 EPC, mailed Oct. 19, 2020, European Patent Application No. 20167216.9, 2 pages.
Everingham et al., "The Pascal Visual Object Classes (VOC) Challenge," IJCV, 2010, 36 pages.
Extended European Search Report mailed Aug. 18, 2020, European Patent Application No. 20167216.9, 12 pages.
Felzenszwalb et al., "A Discriminatively Trained, Multiscale, Deformable Part Model," CVPR, 2008, 8 pages.
Fu et al., "Object-based RGBD Image Co-Segmentation with Mutex Constraint," CVPR, 2015, 9 pages.
Gonzalez-Garcia et al., Do Semantic Parts Emerge in Convolutional Neural Networks? IJCV, 2018, 19 pages.
Ham et al., "Proposal Flow," CVPR, 2016, 10 pages.
Han et al., "SCNet: Learning Semantic Correspondence," ICCV, 2017, 10 pages.
He et al., "Deep Residual Learning for Image Recognition," CVPR, 2016, 9 pages.
Honari et al., "Improving Landmark Localization with Semi-supervised Learning," CVPR, 2018, 10 pages.
Hung et al., "SCOPS: Self-Supervised Co-Part Segmentation," 2019 IEEE/CVF Conference on Computer Vision and Pattern Recognition (CVPR), Jun. 15, 2019, 10 pages.
Ieee, "IEEE Standard 754-2008 (Revision of IEEE Standard 754-1985): IEEE Standard for Floating-Point Arithmetic," Aug. 29, 2008, 70 pages.
Joulin et al., "Multi-Class Cosegmentation," CVPR, 2012, 8 pages.
Kiefel et al., "Human Pose Estimation with Fields of Parts," ECCV, 2014, 23 pages.
Kim et al., "Deformable Spatial Pyramid Matching for Fast Dense Correspondences," CVPR, 2013, 8 pages.
Krause et al., "3D Object Representations for Fine-Grained Categorization," IEEE International Conference on Computer Vision Workshops, 2013, 8 pages.
Krause et al., "Fine-Grained Recognition Without Part Annotations," CVPR, 2015, 10 pages.
Krizhevsky et al., "ImageNet Classification with Deep Convolutional Neural Networks," In Advances in Neural Information Processing Systems, 2012, 9 pages.
Lee et al., "Learning the Parts of Objects by Non-Negative Matrix Factorization," Nature, Aug. 16, 1999, 4 pages.
Liu et al., "Deep Learning Face Attributes in the Wild," ICCV, 2015, 9 pages.
Liu et al., "Sift flow: Dense Correspondence Across Scenes and its Applications," IEEE Transactions on Pattern Analysis and Machine Intelligence, 2011, 17 pages.
Maaten et al., "Visualizing Data Using T-SNE," Journal of Machine Learning Research 9, Nov. 2008, 27 pages.

(56) References Cited

OTHER PUBLICATIONS

Office Action for European Application No. 20167216.9, mailed Mar. 24, 2023, 6 pages.
Pathak et al., "Constrained Convolutional Neural Networks for Weakly Supervised Segmentation," 2015 IEEE International Conference on Computer Vision, Dec. 7, 2015, 10 pages.
Razavian et al., "CNN Features Off-the-shelf: An Astounding Baseline for Recognition," CVPR, 2014, 8 pages.
Rocco et al., "Convolutional Neural Network Architecture for Geometric Matching," CVPR, 2017, 10 pages.
Rocco et al., "End-to-End Weakly-Supervised Semantic Alignment," CVPR, 2018, 9 pages.
Rubinstein et al., "Unsupervised Joint Object Discovery and Segmentation in Internet Images," CVPR, 2013, 8 pages.
Rubio et al., "Unsupervised Co-segmentation Through Region Matching," CVPR, 2012, 8 pages.
Selvaraju et al., "Grad-CAM: Visual Explanations from Deep Networks via Gradient-Based Localization," Proceedings of the IEEE International Conference on Computer Vision, 2017, 9 pages.
Sharma, "One shot Joint Colocalization & Cosegmentation," May 17, 2020, retrieved Oct. 30, 2020, from https://arxiv.org/pdf/1705.06000.pdf, 8 pages.
Shelhamer et al., Fully Convolutional Networks for Semantic Segmentation, TPAMI, 2016, 10 pages.
Shu et al., "Deforming Autoencoders: Unsupervised Disentangling of Shape and Appearance," ECCV, 2018, 29 pages.
Simon et al., "Hand Keypoint Detection in Single Images Using Multiview Bootstrapping," CVPR, 2017, 9 pages.
Simonyan et al., "Very Deep Convolutional Networks for Large-Scale Image Recognition," Apr. 10, 2015, 14 pages.
Suwajanakorn et al., "Discovery of Latent 3D Keypoints via End-to-End Geometric Reasoning," Advances in Neural Information Processing Systems, Jul. 2018, 13 pages.
Thewlis et al., "Unsupervised learning of Object Frames by Dense Equivariant Image Labelling," ICCV, 2017, 12 pages.
Thewlis et al., "Unsupervised Learning of Object Landmarks by Factorized Spatial Embeddings," ICCV, 2017, 10 pages.
Tsai et al., "Semantic Co-segmentation in Videos," ECCV, 2016, 16 pages.
Office Action mailed Feb. 22, 2025 in Chinese Patent Application No. 202010268572.3, NVIDIA Corporation, 20 pages including translation.

* cited by examiner

SEGMENTATION USING AN UNSUPERVISED NEURAL NETWORK TRAINING TECHNIQUE

CROSS-REFERENCE TO RELATED APPLICATION

This application is a continuation of U.S. patent application Ser. No. 16/378,464, filed Apr. 8, 2019, entitled "SEGMENTATION USING AN UNSUPERVISED NEURAL NETWORK TRAINING TECHNIQUE," the disclosure of which is incorporated by reference herein in its entirety.

BACKGROUND

In various contexts such as computer vision, a major challenge in analyzing objects is to develop a model that is robust to a multitude of variations such as object transformations and deformations due to changes in camera pose, occlusions, object appearance, and pose variation. Parts are able to provide an intermediate representation of objects that is robust with respect to various types of variations. Accordingly, part-based representations are used in a variety of object analysis tasks such as 3D reconstruction, detection, fine-grained recognition, pose estimation, and more.

Different types of 2D part representations exist, such as those that use landmarks, bounding boxes, and part segmentation. However, there are many challenges to these annotations, which can be very computationally expensive and/or require a user to manually annotate large amounts of training data to generate predictive models. Consequently, it can be difficult to build a fully-supervised model that can detect or segment object parts in an image.

BRIEF DESCRIPTION OF THE DRAWINGS

Various techniques will be described with reference to the drawings, in which.

DETAILED DESCRIPTION

In an embodiment, techniques described herein are implemented as systems and methods to implement a self-supervised framework for part segmentation. In an embodiment, a model is given an image collection of the same object category. In an embodiment, parts provide an intermediate representation of objects that is to be robust with respect to camera, pose, and appearance variations. In an embodiment, a self-supervised deep learning framework to determine part segments utilizes one or more loss functions that aid in prediction of part segments based on a set of constraints for segment detection. In an embodiment, a self-supervised or unsupervised neural network is trained using one or more loss functions based on constraints of one or more of: geometric concentration; robustness to object variation; and sematic consistency across different object instances. In an embodiment part representations are robust to variations and can be used to help in high-level object understanding. In an embodiment, an image collection of a single object category can have high variability with regard to pose, object appearances, camera viewpoint, presence of multiple objects, occlusion, and other variations that make the detection of part segments challenging.

An unsupervised deep learning framework for part segmentation is implemented, in an embodiment, where a neural network is trained on part segmentations that are semantically consistent across different objects types and can be applied to other types of rigid or non-rigid object categories. As described herein, an "object" may alternatively refer to an entire logical or physical object (e.g., an animal such as a bird) or a part of an object (e.g., head of a bird). In an embodiment, the neural network predicts part segmentation which provides richer intermediate object representation compared to landmarks or bounding boxes. In an embodiment, the neural network is used for part segmentation detection.

In an embodiment, a neural network is trained in an unsupervised manner to detect one or more boundaries (e.g., boundaries determined from part segments) of one or more objects within one or more images based at least in part on one or more loss functions that encode rules that constrain how part segments are determined. In an embodiment, the one or more constraints include at least one of: geometric density; spatial invariance; and semantic consistency. In an embodiment, the neural network is trained on a collection of images of an object category and predicts part segments based on a single image of an object of the same category.

Figure 1:
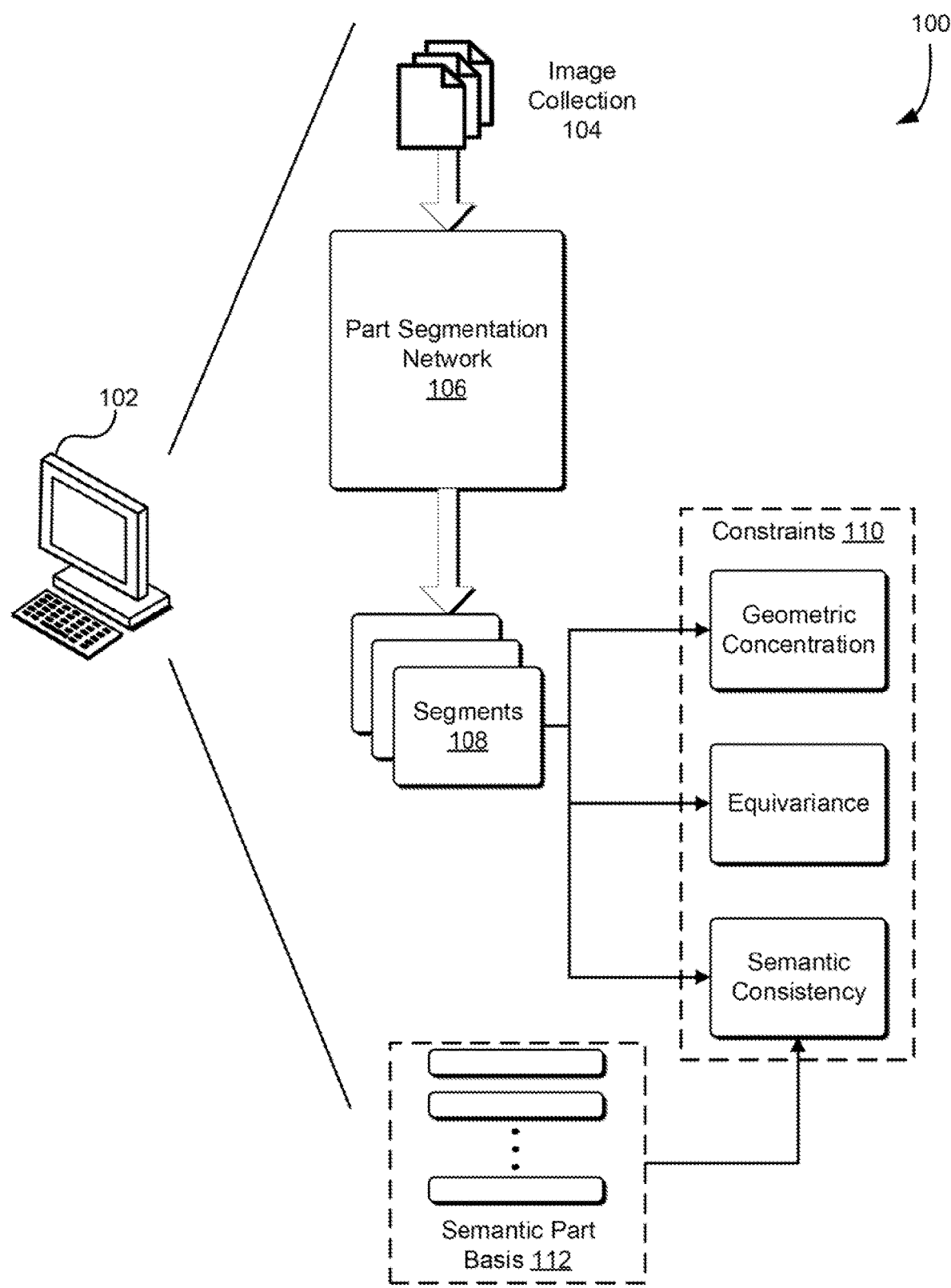
FIG. 1 illustrates a system in which a framework for self-supervised part co-segmentation is implemented, in accordance with one embodiment.

In an embodiment, FIG. 1 illustrates a system 100 in which a framework for self-supervised part co-segmentation is implemented, in accordance with one embodiment. In an embodiment, a computer system 102 such as an image processing system comprising memory, one or more hardware sensors that capture one or more images, one or more processors that detect one or more part segments of one or more objects within the one or more images based, at least in part on a neural network trained in an unsupervised manner to infer the one or more part segments, and one or more memories that store parameters associated with the one or more neural networks. In an embodiment, the parameters associated with the one or more neural networks are weights to the neural network that determined as part of training the neural network to segment images. In an embodiment, hardware sensors that capture one or more images includes video camcorders, cameras, and other such devices that can be used to capture or generate video and/or still images. In an embodiment, one or more hardware sensors are used to obtain at least a portion of the image collection, wherein the one or more hardware sensors includes a video capture device and at least a portion of the image collection is from a video captured by the video capture device.

In an embodiment, the system (e.g., the computer system 102) obtains a collection of images {I}104 that are of the same object category or classification. In an embodiment, images are tagged as being part of a particular category by one or more users. In an embodiment, the system obtains the image collection via a network from a repository of images that are organized by category. In an embodiment, the image collection includes still images of a video (e.g., recorded by a camera in real-time). In an embodiment, the image collection is used to train a part segmentation network $\mathcal{F}$ with parameters $\theta_f$. In an embodiment, the neural network is a fully convolutional neural network (FCN) with a channel-wise software max to generate the part response maps: $R = \mathcal{F}(I; \theta_f) \in [0,1]^{(K+1) \times H \times W}$ where K denotes the number of parts and H×W is the image resolution. In an embodiment, the part segmentation network 106 predicts K+1 channels that includes K foreground channels and one background channel. In an embodiment, the channels are segments 108 as illustrated in FIG. 1. In an embodiment, the final part segmentation results are obtained by normalizing each part map with a maximum response value in the spatial dimension and set the background map as a constant with value $T_R$. In an embodiment, the normalization is formalized as:

$$\hat{R}(k, i, j) = R(k, i, j) / \max_{u,v}(R(k, u, v)).$$

The normalization is used, in an embodiment, to enhance weak part responses and then the part segmentation is obtained with the argmax function along the channel dimension. DeepLab-V2 with ResNet50 is used as part of the segmentation network, in an embodiment.

Ground truth segmentation annotations of images in the image collection are not required or assumed, in accordance with at least one embodiment. In an embodiment, the system formulates a set of constraints 110 as differentiable loss functions to encourage certain properties of a part segmentation including, but not limited to: geometry concentration; equivariance; and semantic consistency. In an embodiment, the set of constraints encode properties of good part segmentation as a set of loss functions. Contrary to other co-segmentation approaches and in an embodiment, techniques described herein improve the operation of computer systems at least because the techniques described in this disclosure do not require multiple images during test-time inference as inputs rather, a network as described in greater detail herein above and below can be configured to accept a single image as an input during test time, resulting in better portability of the trained model to unseen test images. Other segmentation approaches may rely on multiple images at inference time to optimize segment predictions, but are either unable to generate part segment predictions or generate at much poorer quality compared to techniques described herein. In an embodiment, the loss functions described herein are in accordance with those discussed in connection with FIGS. 2-5.

In an embodiment, the part segmentation network 106 and the semantic part basis 112 are trained with one or more loss functions. In an embodiment, the loss functions include geometric concentration loss, equivariance loss, and semantic consistency loss, with orthonormal constraints. In an embodiment, the final objective function is a linear combination of these loss functions:

$$\mathcal{L}_{all} = \lambda_{con}\mathcal{L}_{con} + \lambda_{eqv}\mathcal{L}_{eqv} + \lambda_{sc}\mathcal{L}_{sc} + \lambda_{on}\mathcal{L}_{on}$$

In an embodiment, different weighting coefficients are applied to each of these loss functions. In an embodiment, ($\lambda_{con}$, $\lambda_{eqv}$, $\lambda_{sc}$, $\lambda_{on}$) are set to (0.1, 10, 100, 0.1) or calculated based on such values and/or proportions. In an embodiment, the weights are obtained based at least in part on a coarse grid search on a subset of the dataset images.

Geometric concentration refers to, in an embodiment, a tendency for pixels belonging to the same object part or segment usually being spatially concentrated within an image and forming a connected component unless there are occlusions or multiple instances. in an embodiment, the system imposes, as a first loss function, the geometric concentration on the part response maps to shape the part segments. In an embodiment, the system utilizes a loss term that encourages pixels belonging to a part to be spatially close to the part center. In an embodiment, the part center for a part k along axis u is calculated as: $c_u^k = \Sigma_{u,v} u \cdot R(k, u, v)/z_k$ where $z_k = \Sigma_{u,v} R(k, u, v)$ is the normalization term to transform the part response map into a spatial probability distribution function. Accordingly, in an embodiment, the geometric concentration loss function is formulated as: $\mathcal{L}_{con} = \Sigma_k \Sigma_{u,v} \|\langle u, v\rangle - \langle c_u^k, c_v^k\rangle\|^2 \cdot R(k, u, V)/z_k$ and is differentiable with respect to $c_u^k$, $R(k, u, v)$, and $z_k$.

A geometric loss function, including those described above, is a constraint imposed during training that encourages geometric concentration of parts and tries to minimize the variance of spatial probability distribution function $R(k, u, v)/z_k$. In an embodiment, the geometric loss function penalizes a part response based on the distance from the part center. In an embodiment, a loss function based on separation (diversity) loss that maximizes the distance between different landmarks is implemented by the system. In an embodiment, such constraints would result in separated part segments with background pixels in between.

Figure 2:
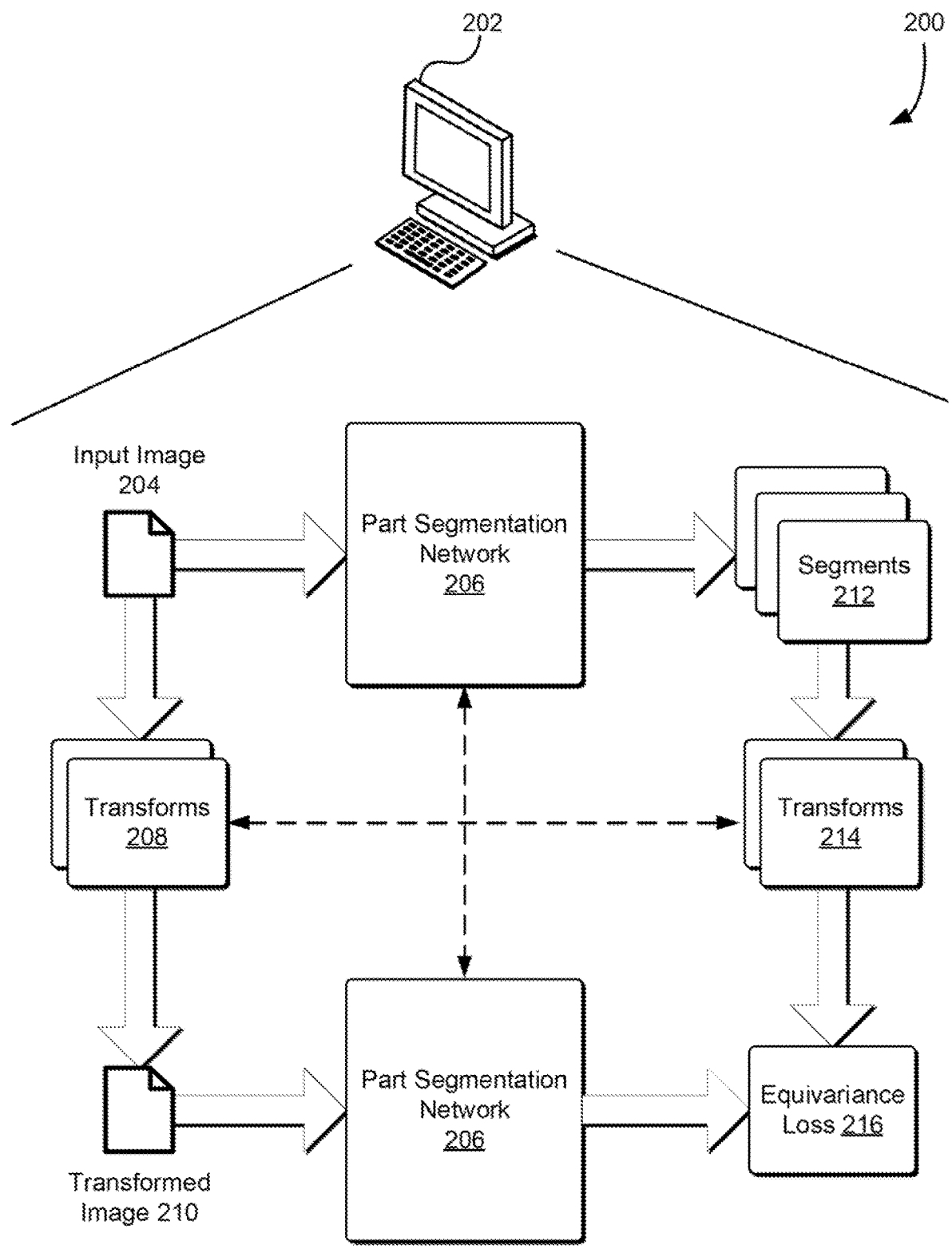
FIG. 2 illustrates a system in which equivariance constraints are employed in part segmentation to encourage robustness to spatial variations, in accordance with one embodiment.

FIG. 2 illustrates a system 200 in which equivariance constraints are employed in part segmentation to encourage robustness to spatial variations, in accordance with one embodiment. In an embodiment, the system is or includes a computer system 202. The computer system 202, in an embodiment, comprises a processor comprising one or more arithmetic logical units (ALUs) to calculate a loss function to enforce equivariance constraints. In an embodiment, the system obtains an input image 204 from a set of input images during training of a part segmentation network 206. In an embodiment, the part segmentation network 206 is in accordance with those described elsewhere in this disclosure, such as in connection with FIGS. 1 and 4. In an embodiment, for each training image, the system performs one or more transforms 208 which are operations that manipulate or otherwise alter the input image 204 to generate a transformed image 210. In an embodiment, the computer system applies a spatial transform $T_s(\ )$ and appearance perturbation $T_a(\ )$ from a predefined parameter range. In an embodiment, a spatial transform refers to a transform to spatial properties of the input image 204 such as a translation, rotation, reflection, etc. operation. In an embodiment, an appearance perturbation is an operation that alters the color or gradient of the picture (e.g., converts the picture from a color image to greyscale). In an embodiment, the spatial transform is selected randomly or pseudo-randomly from a defined range of values. In an embodiment, the transformed image 210 is used as an input to a part segmentation network 206 to determine a set of segments or boundaries of the transformed image that are used to compute equivariance loss, as described in greater detail below.

The input image 204, in an embodiment, is used as an input to a part segmentation network 206 (e.g., same part segmentation network used to identify part segments of the transformed image 210 as described above) to identify a set of segments 212. In an embodiment, transforms 214 are operations that are applied to the segments obtained from performing segmentation to the input image 204. In an embodiment, the transforms 208 and 214 are the same transform operations applied in the same order. In an embodiment, the transforms 214 are a strict subset of the transforms 208 and include only those operations which affect the geometric or spatial properties of the image or segments of the image. In an embodiment, the transforms 208 include a spatial transform operation for rotating the input image 204 and a discoloration operation (e.g., a type of appearance perturbation) to convert the input image 204 to greyscale and the transforms 214 applied to the segments 212 includes the spatial transformation operation but not the discoloration, as the discoloration does not affect the location or geometry of the segment boundaries that were determined. In an embodiment, the transforms 214 are applied to the segments 212 to generate transformed segments of the input image. In an embodiment, an equivariance loss function measures how closely the transformed segments detected from the input match to the segments identified from the transformed image. In an embodiment, an equivariance loss of zero is ideal to reflect the notion that spatial transforms and appearance perturbations should not affect segmentation.

The system, in an embodiment, obtains an input image I from an image collection and generates a transformed image $I'=T_s(T_a(I))$ through the segmentation network and obtains the corresponding response maps R and R'. Part centers ($c_u^k$, $c_v^k$) and ($c_u^{k'}$, $c_v^{k'}$) are computed given the part response maps (e.g., in accordance with the manner for computing part centers described above in connection with FIG. 1). In an embodiment, the equivariance loss 216 is defined as $\mathcal{L}_{eqv} = \lambda_{eqv}^s D_{KL}(R'\|T_s(R)) + \lambda_{eqv}^c \Sigma_k \|<c_u^{k'}, c_v^{k'}> - T_s(<c_u^k, c_v^k>)\|^2$ where $D_{KL}()$ is the Kullback-Leibler divergence distance, and $\lambda_{eqv}^s$, $\lambda_{eqv}^c$ are the loss balancing coefficients. The first term corresponds to the part segmentation equivariance and the second term denotes the part center equivariance, in an embodiment. A spatial transform, in an embodiment, is applied to an image by scaling, rotating, shifting, etc. the image. In an embodiment, the spatial transformed is a random spatial transform that is performed by selecting, randomly or pseudo-randomly, a value for performing a particular transform (e.g., randomly selecting a value between −180 and 180 indicating an angle, in degrees, to rotate the input image). In an embodiment, performing a spatial transform includes one or more of the following operations: scale; rotate; shift; projective transformation; thin-plate-spline transformation; and more.

Figure 3:
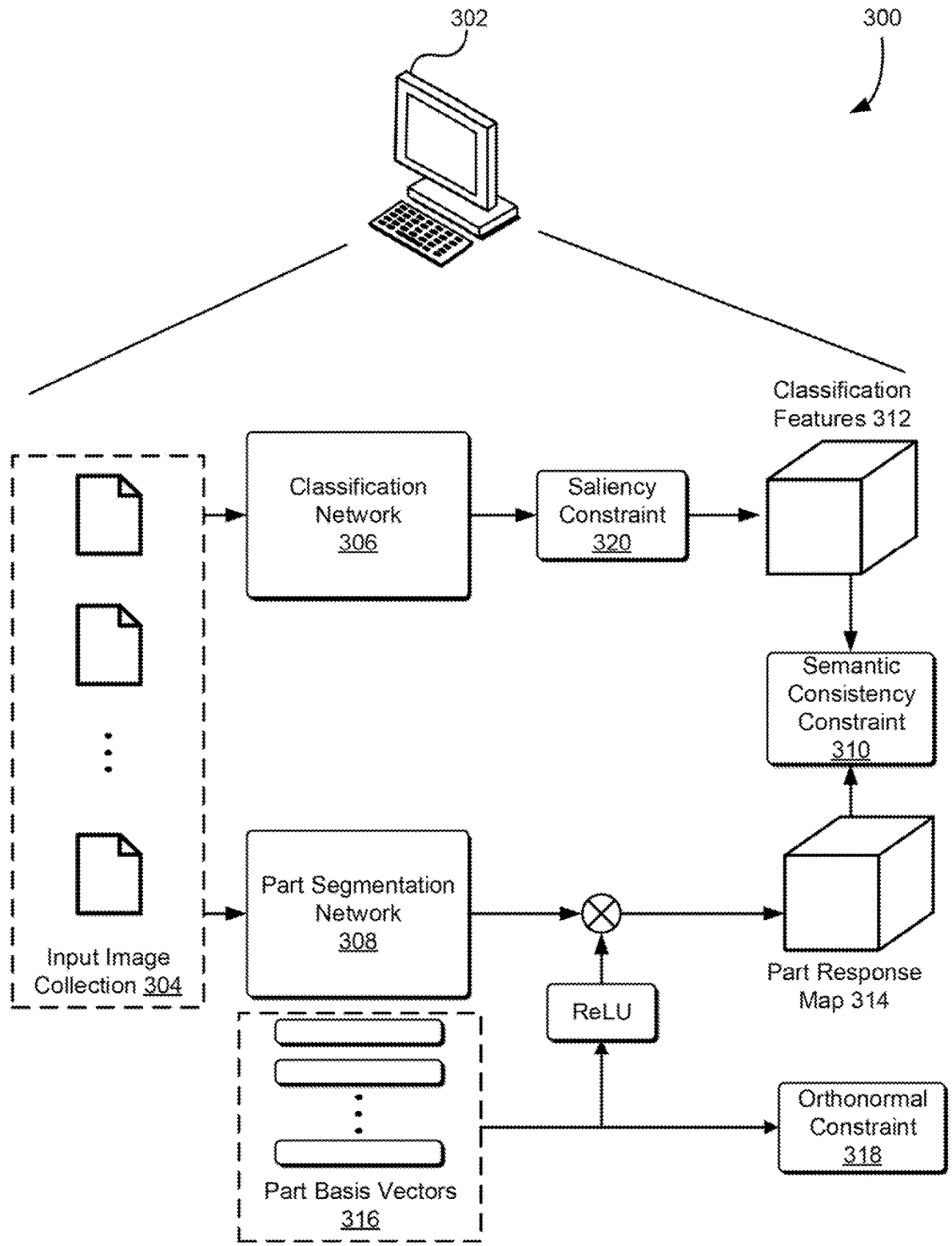
FIG. 3 illustrates a system in which semantic consistency constraints are employed by a computer system as part of part segmentation to encourage robustness to object variations, in accordance with one embodiment.

FIG. 3 illustrates a system 300 in which semantic consistency constraints are employed by a computer system 302 as part of part segmentation to encourage robustness to object variations, in accordance with one embodiment. The computer system implementing semantic consistency constraints is, in an embodiment, a system that trains a neural network based on an input image collection 304. In an embodiment, the input image collection 304 includes one or more images that are of a shared category. In an embodiment, the input image collection 304 includes sets of images from two or more categories of images. In an embodiment, a category refers to a classification of images such that the images share regions of commonality (e.g., all pictures of the same type of animal or object). Information relating to semantic meaning of objects and parts is embedded in intermediate convolutional neural network features of classification networks, in accordance with one embodiment, and a semantic consistency loss function taps into the hidden layer information (e.g., of ImageNet training features). In an embodiment, the computer system 302 analyzes the image to find representative features clusters of classification features corresponding to different part segments.

K representative part features $w_k \in \mathcal{R}^C$, $k \in \{1,2,\ldots,K\}$ are identified, in an embodiment, given C-dimensional classification features $V \in \mathcal{R}^{C \times H \times W}$. In an embodiment, the system simultaneously learns part segmentation R and these representative part features $\{w_k\}$ such that the classification features $V(u,v)$ of a $(u,v)$ pixel belonging to $k^{th}$ part is close to $w_k$ (e.g., $\|V(u,v)-w_k\|^2 \to 0$). In an embodiment, the number of parts, K, is smaller than feature dimensionality C and the representative part features $\{w_k\}$ can be viewed as spanning a K-dimensional subspace in a C-dimensional space and the representative part features can be referred to as part basis vectors. In an embodiment, the number of representative part features is a parameter that a user of the computer system 302 specifies prior to training.

Semantic consistency loss is illustrated in FIG. 3, in accordance with one embodiment, where an image I of the input image collection is obtained (e.g., retrieved from a data storage location or service) and a part segmentation network 308 is used to determine a part response map R for the image I. In an embodiment, the system passes I into a classification network 306 (e.g., a pre-trained classification network) and obtains feature maps of one or more intermediate convolutional neural network layers. The feature map, in an embodiment, is bi-linearly upsampled to have the same spatial resolution of I and R, thereby generating classification features $V \in \mathcal{R}^{C \times H \times W}$ In an embodiment, the computer system 302 learn a set of part basis vectors $\{w_k\}$ that are globally shared across different object instances (e.g., training images) using a semantic consistency constraint 310. In an embodiment, the semantic consistency constraint 310 is a loss function: $\mathcal{L}_{sc} = \Sigma_{u,v} \Sigma_k \|v(u,v) - R(k,u,v) w_k\|^2$ where $V(u,v) \in \mathcal{R}^C$ is the feature vector sampled at spatial location $(u,v)$. In an embodiment, the semantic consistency constraint 310 is calculated based at least in part on classification features 312 (e.g., classification features V illustrated in FIG. 3) and part response map 314 (part response map R illustrated in FIG. 3).

The part segmentation vector R and the part basis vectors $\{w_k\}$ 316, in an embodiment, are learned concurrently using a suitable back-propagation technique. In an embodiment and at least to ensure that different part basis vectors do not cancel each other out, the system enforces non-negativity on both features V and basis vectors $\{w_k\}$. Non-negativity of vector values is enforced, in an embodiment, using a rectified linear unit (ReLU) layer. Part segmentation R, in an embodiment, is the output of a softmax function and is naturally non-negative. In an embodiment, the learned part basis improves over the training process. In an embodiment, representative part features, as described below in connection with FIG. 3, are part basis vectors which are learned using backpropagation.

In an embodiment, semantic consistency loss is viewed as a linear subspace recovery problem with respect to the embedding space provided by the feature extractor (e.g., classification network) on the input image collection. As training progresses, in an embodiment, the part bases gradually converges to the most representative direction of each part in the embedding space provided by the pre-trained deep features, and the recovered subspace can be described as the span of the basis $<w_k>$. In an embodiment, the non-negativity ensures that the weights R(k, u, v) are interpreted as part responses. With the proposed semantic consistency loss, in an embodiment, the system explicitly enforces the cross-instance semantic consistency through the learned part basis $w_k$, based at least in part on the same part response having similar semantic feature embeddings in the pre-trained feature space.

An orthonormal constraint 318 is imposed as an additional constraint on the part basis $w_k$ to push them apart, in an embodiment. A matrix W denotes a set of basis vectors, in an embodiment, where each row is a normalized part basis vector $w_k/\|w_k\|$, and the orthonormal constraint is formulated as a loss function on W: $\mathcal{L} = \|WW^T - I\|_F^2$ where $\|\cdot\|_F^2$ is the Forbenious norm and I is the identity matrix of size K×K. In an embodiment, orthonormal constraint is used to reduce (e.g., minimize) the correlation between different basis vectors to obtain a more concise basis set resulting in better part responses.

A saliency constraint 320 is imposed as an additional constraint, in an embodiment. In an embodiment, an unsupervised saliency detection method is utilized to suppress the background features in V so that the learned part basis do not correspond to background regions. In an embodiment, for a given image I and an unsupervised saliency map $D \in [0,1]H \times W$, soft-mask of the feature map V is represented as $D \circ V$ where $\circ$ is the Hadamard (entry-wise) product, before passing it into the semantic consistency loss function. In an embodiment, semantic consistency loss is interpreted as solving $R(k, u, V)w_k = 0$ which can be viewed as projecting the non-salient background regions into the null space of the learned subspace spanned by $\{w_k\}$. The saliency constraint encapsulates, in an embodiment, the prior knowledge that parts appear on objects (not background) and the union of parts forms an object. In an embodiment, the saliency constraint is imposed in the feature reconstruction loss.

Figure 4:
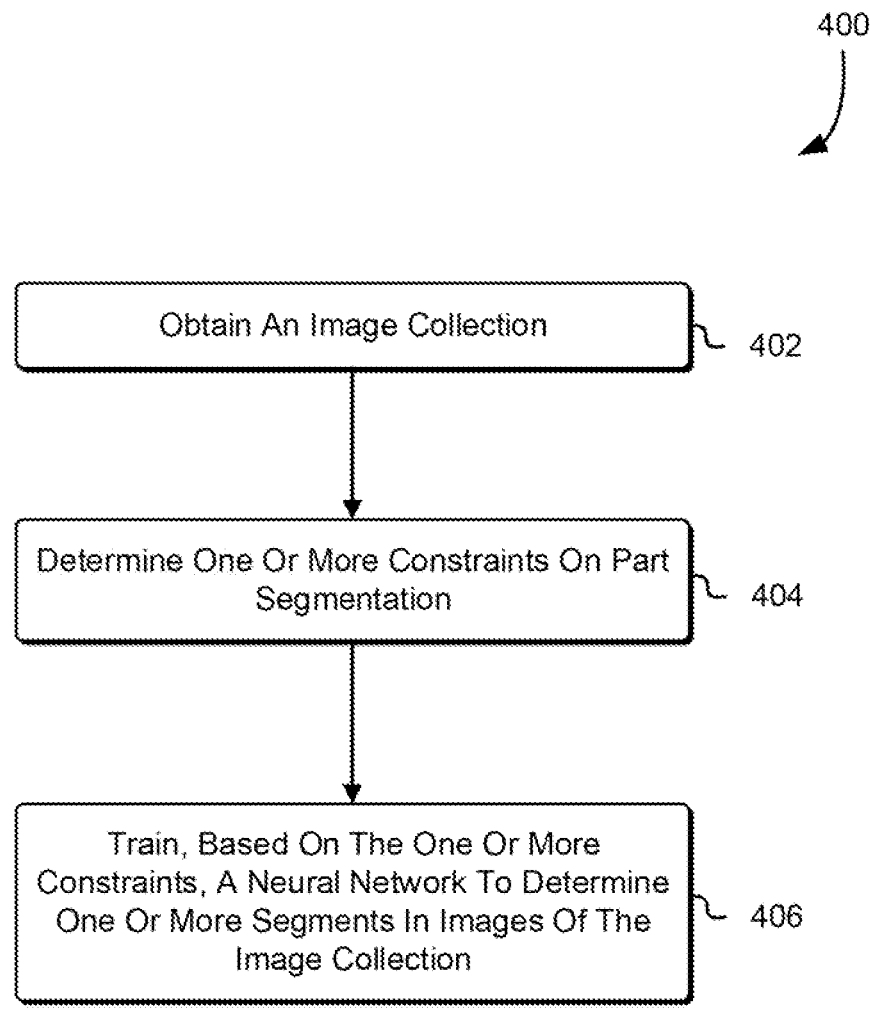
FIG. 4 shows an illustrative example of a process to train a neural network in an unsupervised manner to determine one or more part segments of an image, in accordance with an embodiment.

FIG. 4 shows an illustrative example of a process 400 to train a neural network in an unsupervised manner to determine one or more part segments of an image, in accordance with an embodiment. In an embodiment, some or all of the process 400 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in an embodiment, is stored on a computer-readable storage medium in the form of a computer program comprising a plurality of computer-readable instructions executable by one or more processors. The computer-readable storage medium, in an embodiment, is a non-transitory computer-readable medium. In an embodiment, at least some of the computer-readable instructions usable to perform the process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

The process of FIG. 4 is implemented, in an embodiment, by any suitable computer system such as an image processing system comprising memory, one or more hardware sensors that capture one or more images, one or more processors that detect one or more part segments of one or more objects within the one or more images based, at least in part on a neural network trained in an unsupervised manner to infer the one or more part segments, and one or more memories that store parameters associated with the one or more neural networks. In an embodiment, the parameters associated with the one or more neural networks are weights to the neural network that determined as part of training the neural network to segment images. In an embodiment, hardware sensors that capture one or more images includes video camcorders, cameras, and other such devices that can be used to capture or generate video and/or still images. In an embodiment, one or more hardware sensors are used to obtain at least a portion of the image collection, wherein the one or more hardware sensors includes a video capture device and at least a portion of the image collection is from a video captured by the video capture device.

In an embodiment, the system is configured to obtain 402 an image collection. In an embodiment, the system obtains the image collection from a data store of images that are stored in a compressed format such as a JPEG or GIF file. In an embodiment, the image collection includes frames of a video which are parsed either from a video file (e.g., MPEG or MP4 format video). In an embodiment, the video is a live-stream of video which is captured directly from a camcorder or from a multimedia stream of another computer system via a network (e.g., captured from a webcam of a remote device or from a security camera accessible to the one or more processors via a network). In an embodiment, the image collection includes one or more images of a category or classification (e.g., a collection of human portraits). In an embodiment, the image collection includes images of the same classification which vary in pose, object appearances, camera viewpoint, presence of multiple objects, occlusion, and other variations. In an embodiment, the image collection includes a set of images of humans and facial features which can differ in pose, angle, and more.

The system is configured to determine 404 one or more constraints on part segmentation. In an embodiment, constraints are represented as loss functions that encode rules for part segmentation. In an embodiment, a loss function encodes a property that indicates desirable or undesirable part segments. In an embodiment, a loss function encodes a constraint on geometric concentration that is a constraint imposed during training that encourages geometric concentration of parts and penalizes a part response based on the distance from the part center. In an embodiment, a loss function for equivariance that measures how closely the transformed segments detected from the input match to the segments identified from the transformed image. In an embodiment, an equivariance loss of zero is ideal to reflect the notion that spatial transforms and appearance perturbations should not affect segmentation. In an embodiment, semantic consistency, orthonormal constraint, and saliency constraints are constraints that are used for unsupervised training of a neural network.

A system is configured to train 406 a neural network to determine one or more segments in images of the image collection, in an embodiment. The neural network is trained to detect the one or more part segments without use of or without requiring reference to a ground truth, in an embodiment, based at least in part on optimizing for loss functions that encode properties for good segmentation. In an embodiment, loss functions for training neural networks for part segmentation are specified by a user, which defines the properties for desirable loss segmentation and weighs different factors for good part segmentation or detecting good part segments. In an embodiment, the neural network is a fully convolutional neural network (FCN). In an embodiment, the network is trained to detect segments of images without the aid of ground truth annotations of where the segments should be. In an embodiment, the neural network is trained on one or more rules that constrain part segmentation based on one or more properties that include at least one of: geometric density; invariance to spatial transformation; and semantic consistency. In an embodiment, a segment or part segmentation corresponds to pixels of an image that represent an object or a portion thereof (e.g., eyes of a face) and other pixels of another image represent another segment of the other image that correspond to the same object or portion thereof. In an embodiment, the system generates boundaries from the part segments in the image. A boundary, in an embodiment, refers to a set of lines or edges that represent the boundary of an object. In an embodiment, a segment refers to both the lines/edges that represent the object as well as the portion of the segment within the edges. In an embodiment, a boundary is determined by tracing the outline of one or more part segments that circumscribes or encompasses the entire one or more part segments.

In an embodiment, the neural network is trained using one or more loss functions including a loss function that encodes a constraint on part segmentation based on geometric density, as described in connection with FIG. 1. In an embodiment, the loss functions include a loss function that encodes an equivariance constraint on part segmentation such as in the manner described in connection with FIG. 2. In an embodiment, the equivariance constraint applies a spatial transformation and an appearance perturbation to an image during training to verify whether an equivariance constraint holds. In an embodiment, the loss functions includes a loss function that encodes a constraint on semantic constituency such as in the manner described in connection with FIG. 3.

In an embodiment, the neural network is trained without reliance to or requiring ground truth data of image collection is I by generating the part response maps: $R=\mathcal{F}(I; \theta_f) \in [0,1]^{(K+1) \times H \times W}$ where K denotes the number of parts and H×W is the image resolution. In an embodiment, the part segmentation network predicts K+1 channels that includes K foreground channels and one background channel. In an embodiment, the final part segmentation results are obtained by normalizing each part map with a maximum response value in the spatial dimension and set the background map as a constant with value $T_R$.

In an embodiment, the part segmentation network is with one or more loss functions and ground truth. In an embodiment, the overall loss functions are generalized as a linear combination of individual loss functions multiplied by respective weight. The overall loss function, in an embodiment, is normalized. In an embodiment, a neural network (e.g., part segmentation network) is trained using the one or more loss functions and the differing weight coefficients are adjusted based on ground truth data to further improve the results of the neural network. In an embodiment, the system, as part of training a neural network, obtains an image collection, and calculates one or more weighted loss functions. If ground truth data for segmentation of the images is available, the system may reference the ground truth data as part of training and adjust weights for the respective coefficients of loss functions so that the overall loss function reflects the results expected based on the ground truth data. In an embodiment, some but not all of the images have ground truth data available.

Figure 5:
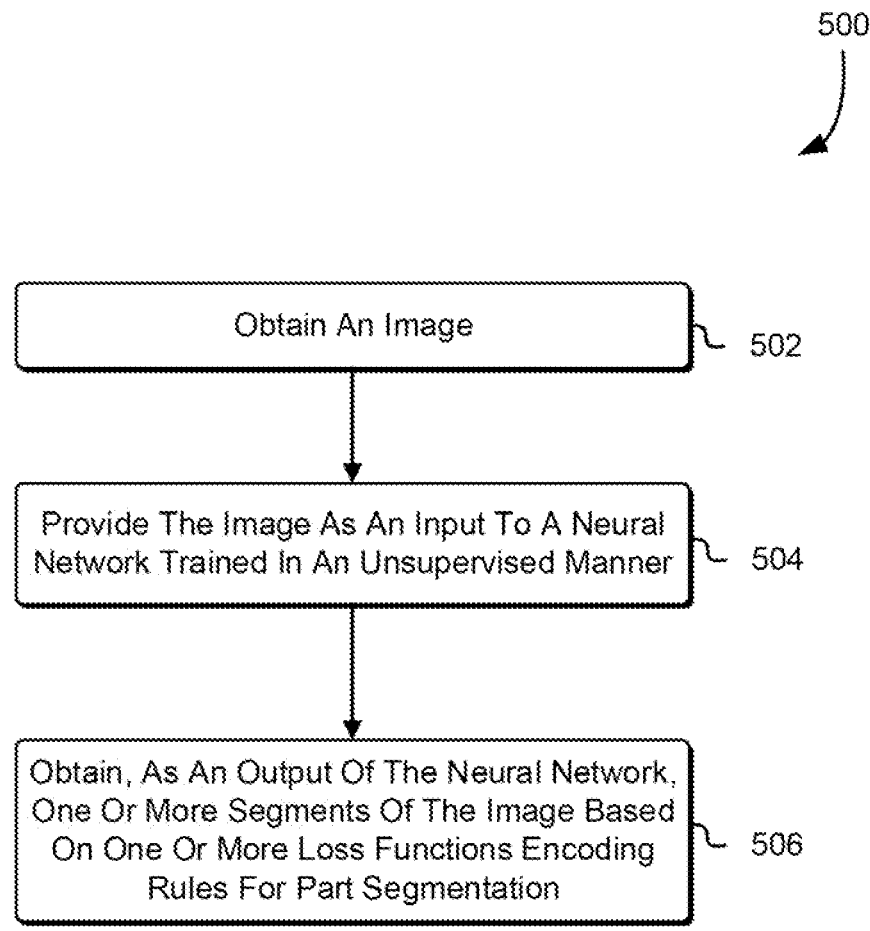
FIG. 5 shows an illustrative example of a process to detect one or more part segments of one or more objects or object parts within one or more images based, at least in part, on a neural network trained in an unsupervised manner to infer the one or more part segments, in accordance with an embodiment.

FIG. 5 shows an illustrative example of a process 500 to detect one or more part segments of one or more objects or object parts within one or more images based, at least in part, on a neural network trained in an unsupervised manner to infer the one or more part segments, in accordance with an embodiment. In an embodiment, some or all of the process 500 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in an embodiment, is stored on a computer-readable storage medium in the form of a computer program comprising a plurality of computer-readable instructions executable by one or more processors. The computer-readable storage medium, in an embodiment, is a non-transitory computer-readable medium. In an embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

The process of FIG. 5 is implemented, in an embodiment, by any suitable computer system such as an image processing system comprising memory, one or more hardware sensors that capture one or more images, one or more processors that detect one or more part segments of one or more objects within the one or more images based, at least in part on a neural network trained in an unsupervised manner to infer the one or more part segments, and one or more memories that store parameters associated with the one or more neural networks. In an embodiment, the parameters associated with the one or more neural networks are weights to the neural network that determined as part of training the neural network to segment images. In an embodiment, hardware sensors that capture one or more images includes video camcorders, cameras, and other such devices that can be used to capture or generate video and/or still images. In an embodiment, one or more hardware sensors are used to obtain at least a portion of the image collection, wherein the one or more hardware sensors includes a video capture device and at least a portion of the image collection is from a video captured by the video capture device. In an embodiment, the system performing the process 500 includes one or more processors and is integrated into a vehicle (e.g., fully-automated or semi-automated vehicle), optical device (e.g., smartphone, smart glasses, or other embedded devices).

In an embodiment, the system is configured to obtain 502 an image. In an embodiment, the image is obtained from a data storage system or data storage system (e.g., using a web service application programming interface call to a remote server). In an embodiment, the image is obtained by capturing an image (e.g., using a video or camera device) and the resulting image is thereby obtained. In an embodiment, the image is a different type of image (e.g., not matching a classification or category) from one or more images used to train a neural network as described in greater detail below. The system, in an embodiment, is in accordance with those described in connection with FIGS. 1-4 and 6-10.

In an embodiment, the system is configured to provide 504 the image as an input to a neural network trained in an unsupervised manner. In an embodiment, the neural network is in accordance with those described in connection with FIG. 4. The system is configured to obtain, in an embodiment, one or more segments of the image using the neural network. In an embodiment, the neural network generates inferences, which are the one or more part segments described above. In an embodiment, the neural networks are trained based on one or more loss functions encoding rules for part segmentation, as described in greater detail elsewhere in this disclosure.

Figure 6:
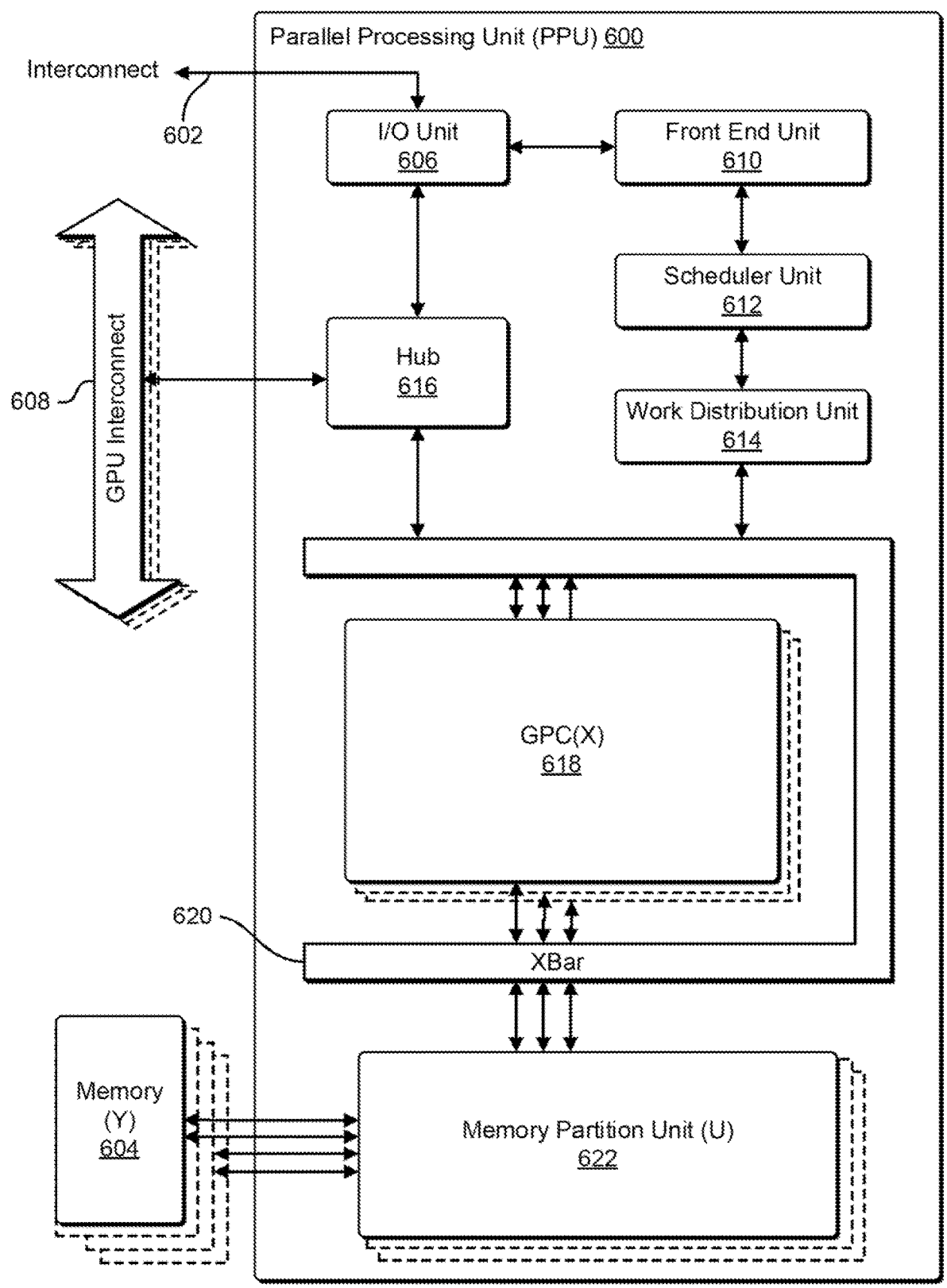
FIG. 6 illustrates an example of parallel processing unit ("PPU"), in accordance with an embodiment.

FIG. 6 illustrates a parallel processing unit ("PPU") 600, in accordance with one embodiment. In an embodiment, the PPU 600 is configured with machine-readable code that, if executed by the PPU, causes the PPU to perform some or all of processes and techniques described throughout this disclosure. In an embodiment, the PPU 600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 600. In an embodiment, the PPU 600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 600 is utilized to perform computations such as linear algebra operations and machine-learning operations. FIG. 6 illustrates an example parallel processor for illustrative purposes only and should be construed as a non-limiting example of processor architectures contemplated within the scope of this disclosure and that any suitable processor may be employed to supplement and/or substitute for the same.

In an embodiment, the PPU 600 comprises one or more arithmetic logic units (ALUs) that, if executed, cause the one or more ALUs to help train one or more neural networks to detect one or more part segments of one or more objects within one or more images in an unsupervised manner. In an embodiment, the same or different ALUs are also configured to detect one or more part segments of one or more objects of one or more inferences using the one or more neural networks at inference time. In an embodiment, various processes and techniques described throughout this disclosure are executed in parallel across multiple processing units of the PPU. In an embodiment, part segmentation vectors and part basis vectors are learned concurrently across two or more processing units of the PPU during back-propagation.

In an embodiment, one or more PPUs are configured to accelerate High Performance Computing ("HPC"), data center, and machine learning applications. In an embodiment, the PPU 600 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 600 includes an Input/Output ("I/O") unit 606, a front-end unit 610, a scheduler unit 612, a work distribution unit 614, a hub 616, a crossbar ("Xbar") 620, one or more general processing clusters ("GPCs") 618, and one or more partition units 622. In an embodiment, the PPU 600 is connected to a host processor or other PPUs 600 via one or more high-speed GPU interconnects 608. In an embodiment, the PPU 600 is connected to a host processor or other peripheral devices via an interconnect 602. In an embodiment, the PPU 600 is connected to a local memory comprising one or more memory devices 604. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 608 may refer to a wire-based multi-lane communications link that is used by systems to scale and include one or more PPUs 600 combined with one or more CPUs, supports cache coherence between the PPUs 600 and CPUs, and CPU mastering. In an embodiment, data and/or commands are transmitted by the high-speed GPU interconnect 608 through the hub 616 to/from other units of the PPU 600 such as one or more copy engines, video encoders, video decoders, power management units, and other components which may not be explicitly illustrated in FIG. 6.

In an embodiment, the I/O unit 606 is configured to transmit and receive communications (e.g., commands, data) from a host processor (not illustrated in FIG. 6) over the system bus 602. In an embodiment, the I/O unit 606 communicates with the host processor directly via the system bus 602 or through one or more intermediate devices such as a memory bridge. In an embodiment, the I/O unit 606 may communicate with one or more other processors, such as one or more of the PPUs 600 via the system bus 602. In an embodiment, the I/O unit 606 implements a Peripheral Component Interconnect Express ("PCIe") interface for communications over a PCIe bus. In an embodiment, the I/O unit 606 implements interfaces for communicating with external devices.

In an embodiment, the I/O unit 606 decodes packets received via the system bus 602. In an embodiment, at least some packets represent commands configured to cause the PPU 600 to perform various operations. In an embodiment, the I/O unit 606 transmits the decoded commands to various other units of the PPU 600 as specified by the commands. In an embodiment, commands are transmitted to the front-end unit 610 and/or transmitted to the hub 616 or other units of the PPU 600 such as one or more copy engines, a video encoder, a video decoder, a power management unit, etc. (not explicitly illustrated in FIG. 6). In an embodiment, the I/O unit 606 is configured to route communications between and among the various logical units of the PPU 600.

In an embodiment, a program executed by the host processor encodes a command stream in a buffer that provides workloads to the PPU 600 for processing. In an embodiment, a workload comprises instructions and data to be processed by those instructions. In an embodiment, the buffer is a region in a memory that is accessible (e.g., read/write) by both the host processor and the PPU 600 the host interface unit may be configured to access the buffer in a system memory connected to the system bus 602 via memory requests transmitted over the system bus 602 by the I/O unit 606. In an embodiment, the host processor writes the command stream to the buffer and then transmits a pointer to the start of the command stream to the PPU 600 such that the front-end unit 610 receives pointers to one or more command streams and manages the one or more streams, reading commands from the streams and forwarding commands to the various units of the PPU 600.

In an embodiment, the front-end unit 610 is coupled to a scheduler unit 612 that configures the various GPCs 618 to process tasks defined by the one or more streams. In an embodiment, the scheduler unit 612 is configured to track state information related to the various tasks managed by the scheduler unit 612 where the state information may indicate which GPC 618 a task is assigned to, whether the task is active or inactive, a priority level associated with the task, and so forth. In an embodiment, the scheduler unit 612 manages the execution of a plurality of tasks on the one or more GPCs 618.

In an embodiment, the scheduler unit 612 is coupled to a work distribution unit 614 that is configured to dispatch tasks for execution on the GPCs 618. In an embodiment, the work distribution unit 614 tracks a number of scheduled tasks received from the scheduler unit 612 and the work distribution unit 614 manages a pending task pool and an active task pool for each of the GPCs 618. In an embodiment, the pending task pool comprises a number of slots (e.g., 32 slots) that contain tasks assigned to be processed by a particular GPC 618; the active task pool may comprise a number of slots (e.g., 4 slots) for tasks that are actively being processed by the GPCs 618 such that as a GPC 618 completes the execution of a task, that task is evicted from the active task pool for the GPC 618 and one of the other tasks from the pending task pool is selected and scheduled for execution on the GPC 618. In an embodiment, if an active task is idle on the GPC 618, such as while waiting for a data dependency to be resolved, then the active task is evicted from the GPC 618 and returned to the pending task pool while another task in the pending task pool is selected and scheduled for execution on the GPC 618.

In an embodiment, the work distribution unit 614 communicates with the one or more GPCs 618 via XBar 620. In an embodiment, the XBar 620 is an interconnect network that couples many of the units of the PPU 600 to other units of the PPU 600 and can be configured to couple the work distribution unit 614 to a particular GPC 618. Although not shown explicitly, one or more other units of the PPU 600 may also be connected to the XBar 620 via the hub 616.

The tasks are managed by the scheduler unit 612 and dispatched to a GPC 618 by the work distribution unit 614. The GPC 618 is configured to process the task and generate results. The results may be consumed by other tasks within the GPC 618, routed to a different GPC 618 via the XBar 620, or stored in the memory 604. The results can be written to the memory 604 via the partition units 622, which implement a memory interface for reading and writing data to/from the memory 604. The results can be transmitted to another PPU 604 or CPU via the high-speed GPU interconnect 608. In an embodiment, the PPU 600 includes a number U of partition units 622 that is equal to the number of separate and distinct memory devices 604 coupled to the PPU 600. A partition unit 622 will be described in more detail below in conjunction with FIG. 8.

In an embodiment, a host processor executes a driver kernel that implements an application programming interface ("API") that enables one or more applications executing on the host processor to schedule operations for execution on the PPU 600. In an embodiment, multiple compute applications are simultaneously executed by the PPU 600 and the PPU 600 provides isolation, quality of service ("QoS"), and independent address spaces for the multiple compute applications. In an embodiment, an application generates instructions (e.g., in the form of API calls) that cause the driver kernel to generate one or more tasks for execution by the PPU 600 and the driver kernel outputs tasks to one or more streams being processed by the PPU 600. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 8A.

Figure 7:
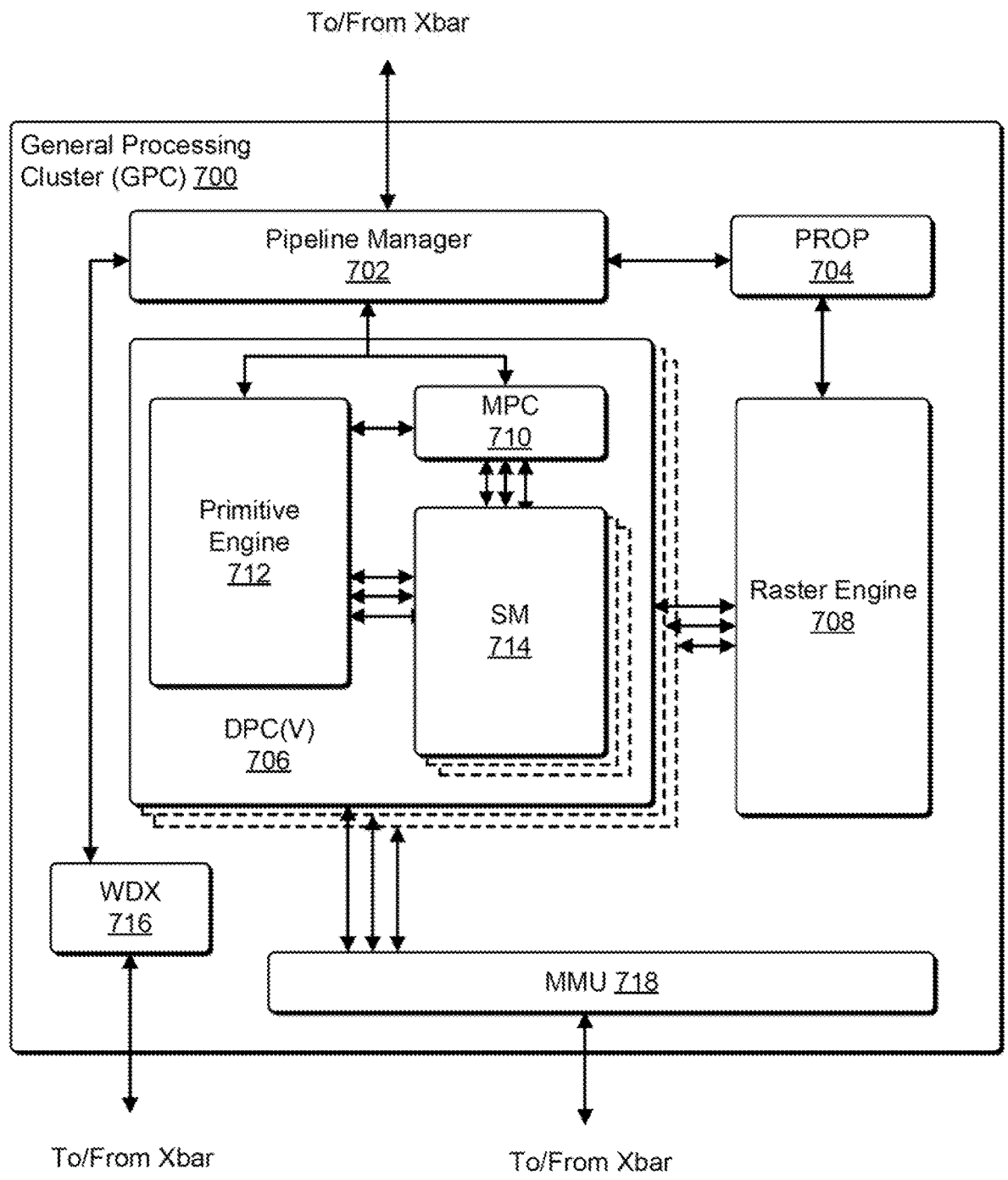
FIG. 7 illustrates an example of a general processing cluster ("GPC"), in accordance with one embodiment.

FIG. 7 illustrates a GPC 700 such as the GPC illustrated of the PPU 600 of FIG. 6, in accordance with one embodiment. In an embodiment, each GPC 700 includes a number of hardware units for processing tasks and each GPC 700 includes a pipeline manager 702, a pre-raster operations unit ("PROP") 704, a raster engine 708, a work distribution crossbar ("WDX") 716, a memory management unit ("MMU") 718, one or more Data Processing Clusters ("DPCs") 706, and any suitable combination of parts. It will be appreciated that the GPC 700 of FIG. 7 may include other hardware units in lieu of or in addition to the units shown in FIG. 7.

In an embodiment, the GPC 700 includes or controls one or more processors to help train one or more neural networks to detect one or more part segments of one or more objects within one or more images in an unsupervised manner and one or more memories to store parameters associated with the one or more neural networks. In an embodiment, the parameters associated with the one or more neural networks are weights that are used to infer part segments of an image. In an embodiment, the GPC 700 is communicatively coupled (e.g., via electronic circuitry) to a hardware sensor device that obtains an image to generate part segment predictions for. In an embodiment, the hardware sensors include one or more of: cameras; camcorders; webcams; smartphones; smart glasses; embedded sensors; infrared sensors; and more.

In an embodiment, the operation of the GPC 700 is controlled by the pipeline manager 702. The pipeline manager 702 manages the configuration of the one or more DPCs 706 for processing tasks allocated to the GPC 700. In an embodiment, the pipeline manager 702 configures at least one of the one or more DPCs 706 to implement at least a portion of a graphics rendering pipeline. In an embodiment, a DPC 706 is configured to execute a vertex shader program on the programmable streaming multiprocessor ("SM") 714. The pipeline manager 702 is configured to route packets received from a work distribution to the appropriate logical units within the GPC 700, in an embodiment, and some packets may be routed to fixed function hardware units in the PROP 704 and/or raster engine 708 while other packets may be routed to the DPCs 706 for processing by the primitive engine 712 or the SM 714. In an embodiment, the pipeline manager 702 configures at least one of the one or more DPCs 706 to implement a neural network model and/or a computing pipeline.

The PROP unit 704 is configured, in an embodiment, to route data generated by the raster engine 708 and the DPCs 706 to a Raster Operations ("ROP") unit in the memory partition unit, described in more detail above. In an embodiment, the PROP unit 704 is configured to perform optimizations for color blending, organize pixel data, perform address translations, and more. The raster engine 708 includes a number of fixed function hardware units configured to perform various raster operations, in an embodiment, and the raster engine 708 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 708 comprises fragments to be processed by any suitable entity such as by a fragment shader implemented within a DPC 706.

In an embodiment, each DPC 706 included in the GPC 700 comprises an M-Pipe Controller ("MPC") 710; a primitive engine 712; one or more SMs 714; and any suitable combination thereof. In an embodiment, the MPC 710 controls the operation of the DPC 706, routing packets received from the pipeline manager 702 to the appropriate units in the DPC 706. In an embodiment, packets associated with a vertex are routed to the primitive engine 712, which is configured to fetch vertex attributes associated with the vertex from memory; in contrast, packets associated with a shader program may be transmitted to the SM 714.

In an embodiment, the SM 714 comprises a programmable streaming processor that is configured to process tasks represented by a number of threads. In an embodiment, the SM 714 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 714 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 714 is described in more detail below.

In an embodiment, the MMU 718 provides an interface between the GPC 700 and the memory partition unit and the MMU 718 provides translation of virtual addresses into physical addresses, memory protection, and arbitration of memory requests. In an embodiment, the MMU 718 provides one or more translation lookaside buffers ("TLBs") for performing translation of virtual addresses into physical addresses in memory.

Figure 8:
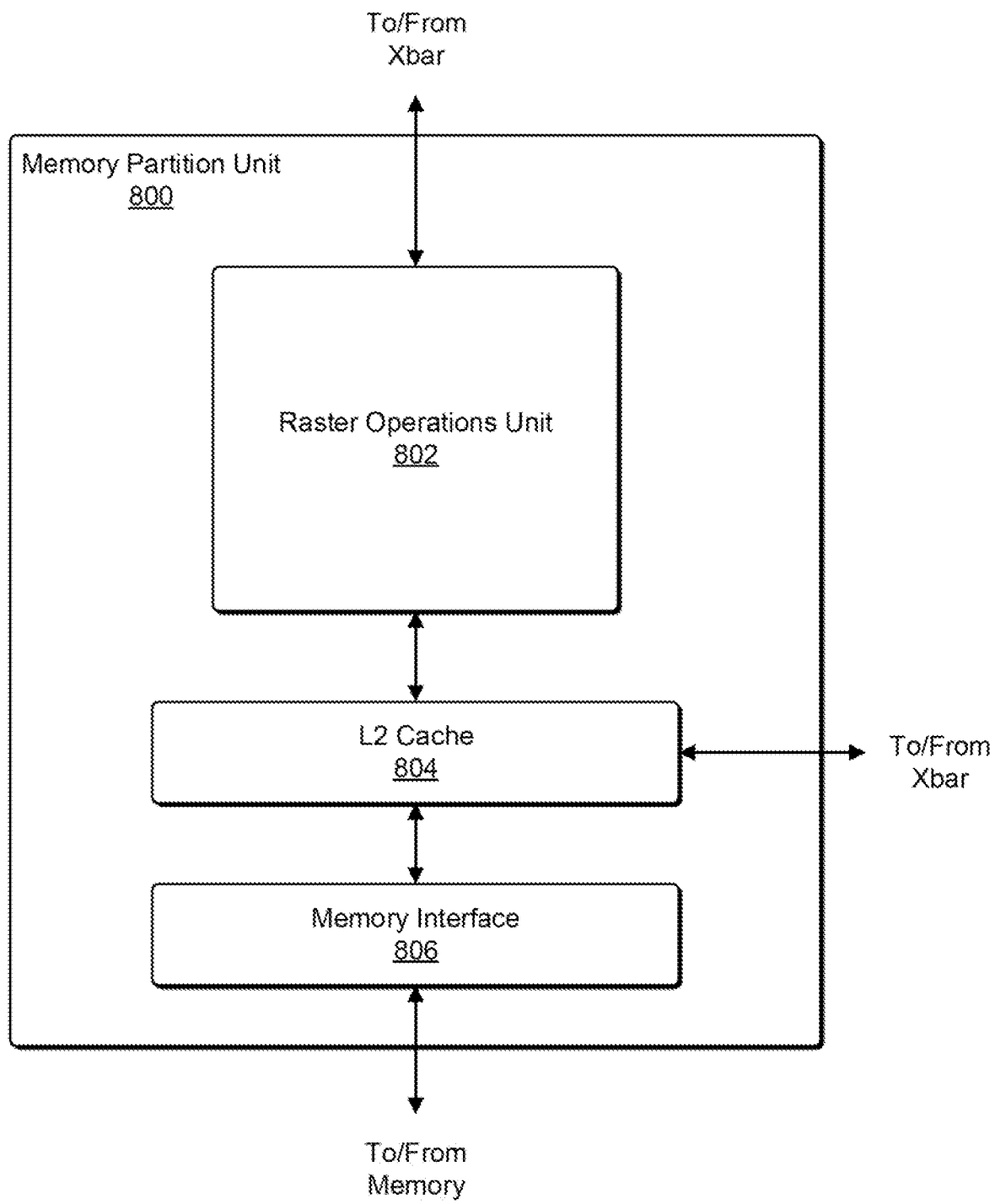
FIG. 8 illustrates an example of a memory partition unit, in accordance with one embodiment.

FIG. 8 illustrates a memory partition unit of a PPU, in accordance with one embodiment. In an embodiment, the memory partition unit 800 includes a Raster Operations ("ROP") unit 802; a level two ("L2") cache 804; a memory interface 806; and any suitable combination thereof. The memory interface 806 is coupled to the memory. Memory interface 806 may implement 32, 64, 128, 1024-bit data buses, or the like, for high-speed data transfer. In an embodiment, the PPU incorporates U memory interfaces 806, one memory interface 806 per pair of partition units 800, where each pair of partition units 800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory partition unit 800 includes or is coupled to memory that stores executable instructions that, if executed by one or more processors (e.g., of a PPU) cause the one or more processors to train one or more neural networks to detect one or more part segments of one or more objects within one or more images in an unsupervised manner and store parameters associated with the one or more neural networks in one or more memories. In an embodiment, the neural network is trained in an unsupervised manner based at least in part on a collection of input images as training data where the ground truth data for part segments of the input images is not known or not needed by the neural network during training. In an embodiment, the neural network is trained using a set of loss functions that encode rules for determining desired part segmentation.

In an embodiment, the memory interface 806 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 800 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 608 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 800 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 6 or other system memory is fetched by the memory partition unit 800 and stored in the L2 cache 804, which is located on-chip and is shared between the various GPCs, in accordance with one embodiment. Each memory partition unit 800, in an embodiment, includes at least a portion of the L2 cache 760 associated with a corresponding memory device. In an embodiment, lower level caches are implemented in various units within the GPCs. In an embodiment, each of the SMs 840 may implement a level one ("L1") cache wherein the L1 cache is private memory that is dedicated to a particular SM 840 and data from the L2 cache 804 is fetched and stored in each of the L1 caches for processing in the functional units of the SMs 840. In an embodiment, the L2 cache 804 is coupled to the memory interface 806 and the XBar 620.

The ROP unit 802 performs graphics raster operations related to pixel color, such as color compression, pixel blending, and more, in an embodiment. The ROP unit $$50, in an embodiment, implements depth testing in conjunction with the raster engine 825, receiving a depth for a sample location associated with a pixel fragment from the culling engine of the raster engine 825. In an embodiment, the depth is tested against a corresponding depth in a depth buffer for a sample location associated with the fragment. In an embodiment, if the fragment passes the depth test for the sample location, then the ROP unit 802 updates the depth buffer and transmits a result of the depth test to the raster engine 825. It will be appreciated that the number of partition units 800 may be different than the number of GPCs and, therefore, each ROP unit 802 can, in an embodiment, be coupled to each of the GPCs. In an embodiment, the ROP unit 802 tracks packets received from the different GPCs and determines which that a result generated by the ROP unit 802 is routed to through the Xbar.

Figure 9:
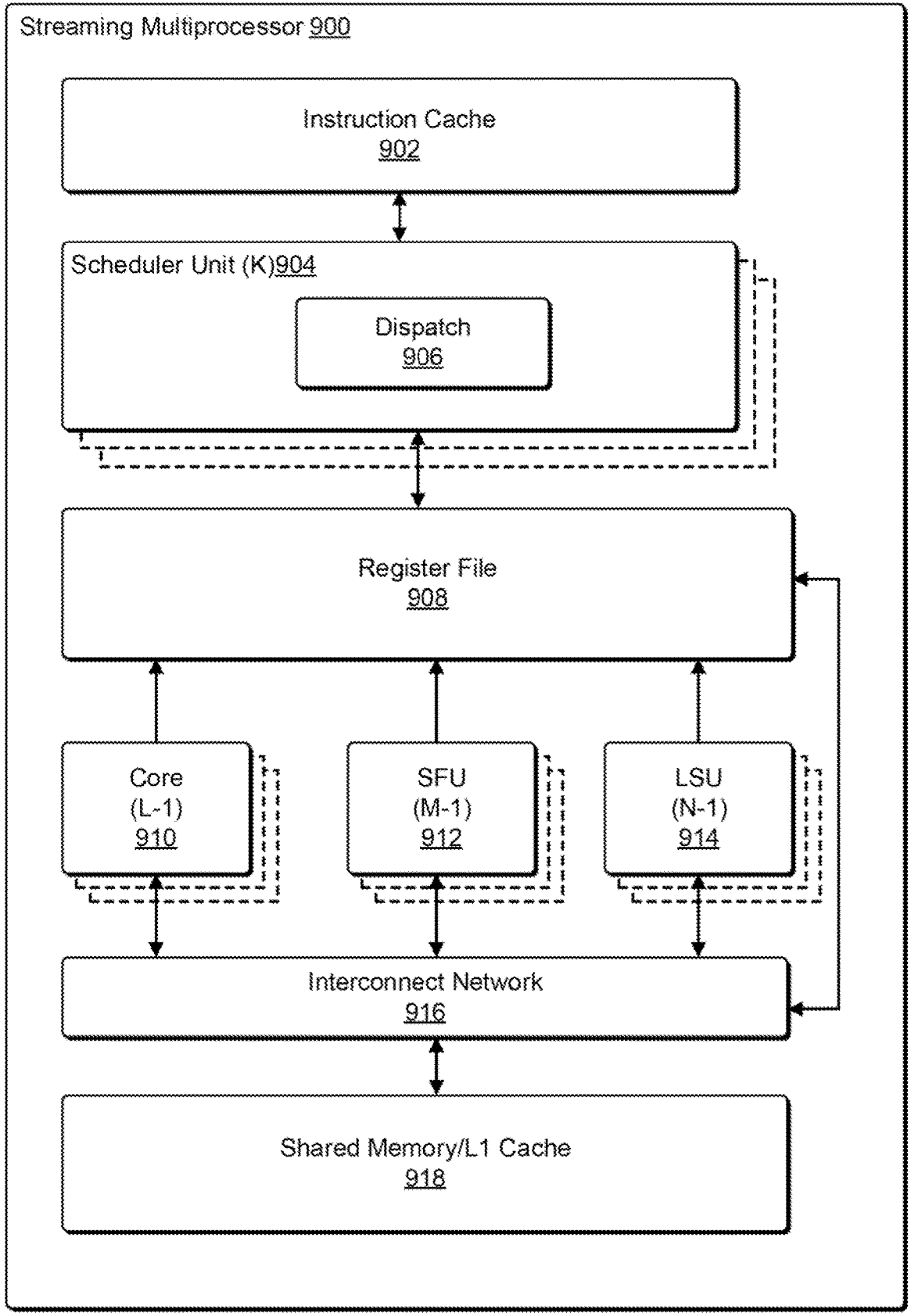
FIG. 9 illustrates an example of a streaming multi-processor, in accordance with one embodiment.

FIG. 9 illustrates a streaming multi-processor such as the streaming multi-processor of FIG. 7, in accordance with one embodiment. In an embodiment, the SM 900 includes: an instruction cache 902; one or more scheduler units 904; a register file 908; one or more processing cores 910; one or more special function units ("SFUs") 912; one or more load/store units ("LSUs") 914; an interconnect network 916; a shared memory/L1 cache 918; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 900. In an embodiment, the scheduler unit 904 receives the tasks from the work distribution unit and manages instruction scheduling for one or more thread blocks assigned to the SM 900. In an embodiment, the scheduler unit 904 schedules thread blocks for execution as warps of parallel threads, wherein each thread block is allocated at least one warp. In an embodiment, each warp executes threads. In an embodiment, the scheduler unit 904 manages a plurality of different thread blocks, allocating the warps to the different thread blocks and then dispatching instructions from the plurality of different cooperative groups to the various functional units (e.g., cores 910, SFUs 912, and LSUs 914) during each clock cycle.

In an embodiment, the SM 900 comprises one or more arithmetic logic units (ALUs) that, if executed, cause the one or more ALUs to help train one or more neural networks to detect one or more part segments of one or more objects within one or more images in an unsupervised manner. In an embodiment, the same or different ALUs are also configured to detect one or more part segments of one or more objects of one or more inferences using the one or more neural networks at inference time. In an embodiment, various processes and techniques described throughout this disclosure are executed in parallel across multiple processing units of the SM. In an embodiment, part segmentation vectors and part basis vectors are learned concurrently across two or more processing units of the SM during back-propagation.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 906 is configured to transmit instructions to one or more of the functional units and the scheduler unit 904 includes two dispatch units 906 that enable two different instructions from the same warp to be dispatched during each clock cycle. In an embodiment, each scheduler unit 904 includes a single dispatch unit 906 or additional dispatch units 906.

Each SM 900, in an embodiment, includes a register file 908 that provides a set of registers for the functional units of the SM 900. In an embodiment, the register file 908 is divided between each of the functional units such that each functional unit is allocated a dedicated portion of the register file 908. In an embodiment, the register file 908 is divided between the different warps being executed by the SM 900 and the register file 908 provides temporary storage for operands connected to the data paths of the functional units. In an embodiment, each SM 900 comprises a plurality of L processing cores 910. In an embodiment, the SM 900 includes a large number (e.g., 128 or more) of distinct processing cores 910. Each core 910, in an embodiment, includes a fully-pipelined, single-precision, double-precision, and/or mixed precision processing unit that includes a floating point arithmetic logic unit (ALU) and an integer arithmetic logic unit. In an embodiment, the floating point arithmetic logic units implement the IEEE 754-2008 standard for floating point arithmetic. In an embodiment, the cores 910 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 910. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 900 comprises M SFUs 912 that perform special functions (e.g., attribute evaluation, reciprocal square root, and the like). In an embodiment, the SFUs 912 include a tree traversal unit configured to traverse a hierarchical tree data structure. In an embodiment, the SFUs 912 include texture unit configured to perform texture map filtering operations. In an embodiment, the texture units are configured to load texture maps (e.g., a 2D array of texels) from the memory and sample the texture maps to produce sampled texture values for use in shader programs executed by the SM 900. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 900 includes two texture units.

Each SM 900 comprises N LSUs 854 that implement load and store operations between the shared memory/L1 cache 806 and the register file 908, in an embodiment. Each SM 900 includes an interconnect network 916 that connects each of the functional units to the register file 908 and the LSU 914 to the register file 908, shared memory/L1 cache 918 in an embodiment. In an embodiment, the interconnect network 916 is a crossbar that can be configured to connect any of the functional units to any of the registers in the register file 908 and connect the LSUs 914 to the register file and memory locations in shared memory/L1 cache 918.

The shared memory/L1 cache 918 is an array of on-chip memory that allows for data storage and communication between the SM 900 and the primitive engine and between threads in the SM 900 in an embodiment. In an embodiment, the shared memory/L1 cache 918 comprises 128 KB of storage capacity and is in the path from the SM 900 to the partition unit. The shared memory/L1 cache 918, in an embodiment, is used to cache reads and writes. One or more of the shared memory/L1 cache 918, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 918 enables the shared memory/L1 cache 918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 900 to execute the program and perform calculations, shared memory/L1 cache 918 to communicate between threads, and the LSU 914 to read and write global memory through the shared memory/L1 cache 918 and the memory partition unit, in accordance with one embodiment. In an embodiment, when configured for general purpose parallel computation, the SM 900 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 10:
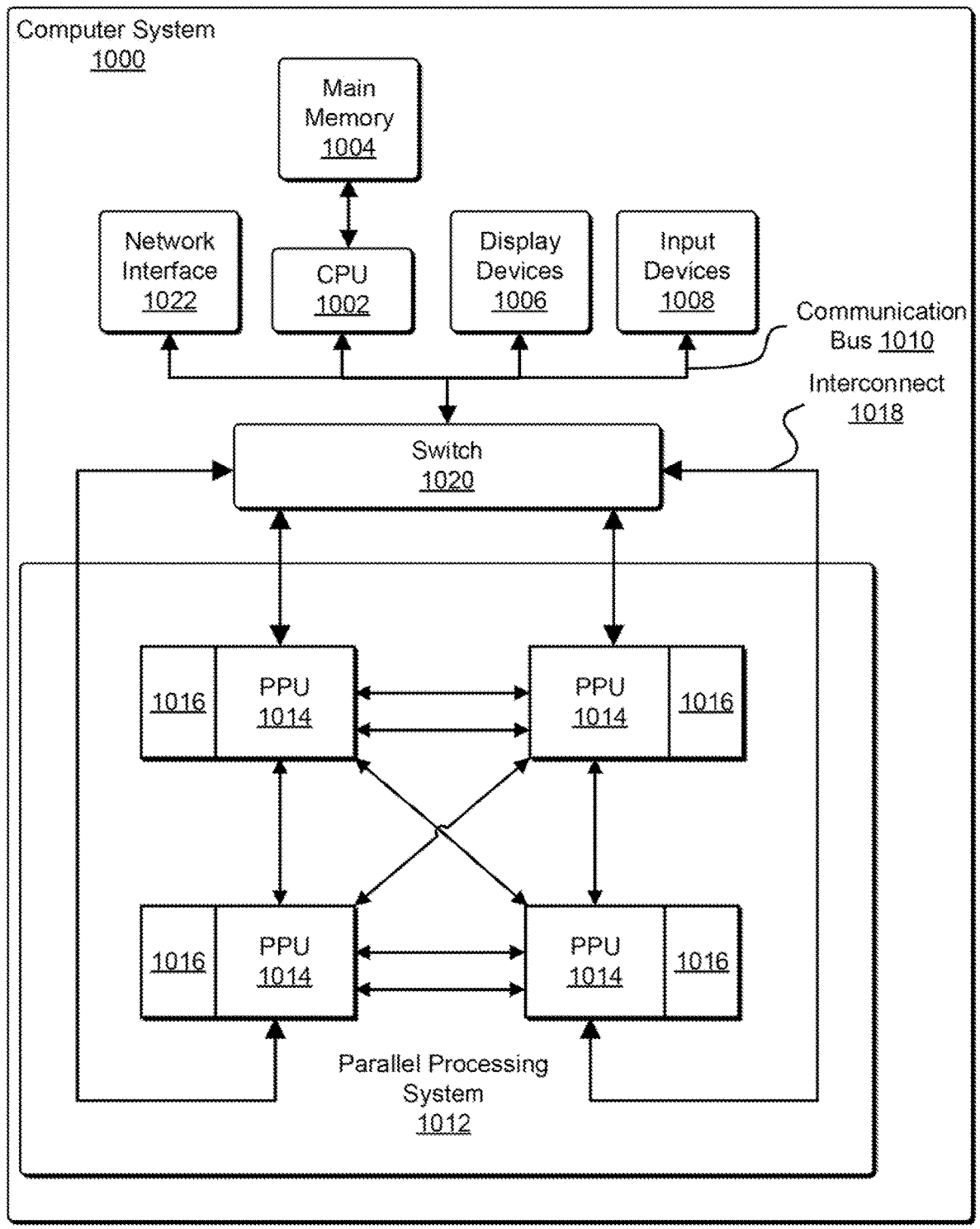
FIG. 10 illustrates a computer system in which the various examples can be implemented, in accordance with one embodiment.

FIG. 10 illustrates a computer system 1000 in which the various architecture and/or functionality can be implemented, in accordance with one embodiment. The computer system 1000, in an embodiment, is configured to implement various processes and methods described throughout this disclosure.

In an embodiment, the computer system 1000 comprises at least one central processing unit 1002 that is connected to a communication bus 1010 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1000 includes a main memory 1004 and control logic (e.g., implemented as hardware, software, or a combination thereof) and data are stored in the main memory 1004 which may take the form of random access memory ("RAM"). In an embodiment, a network interface subsystem 1022 provides an interface to other computing devices and networks for receiving data from and transmitting data to other systems from the computer system 1000. In an embodiment, the computer system 10 comprises memory that stores executable instructions which, if executed by one or more processors, (e.g., the central processing unit 1002) causes the one or more processors to help train one or more neural networks to detect one or more part segments of one or more objects within one or more images in an unsupervised manner. In an embodiment, the neural network, once trained is stored in memory or in a non-volatile storage medium. In an embodiment, the computer system 1000 uses the trained neural network to determine part segments for an image. In an embodiment, computer system 1000 comprises a hardware sensor device that obtains an image to generate part segment predictions for. In an embodiment, the hardware sensors include one or more of: cameras; camcorders; webcams; smartphones; smart glasses; embedded sensors; infrared sensors; and more.

The computer system 1000, in an embodiment, includes input devices 1008, the parallel processing system 1012, and display devices 1006 which can be implemented using a conventional CRT (cathode ray tube), LCD (liquid crystal display), LED (light emitting diode), plasma display, or other suitable display technologies. In an embodiment, user input is received from input devices 1008 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1004 and/or secondary storage. Computer programs, if executed by one or more processors, enable the system 1000 to perform various functions in accordance with one embodiment. The memory 1004, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1002; parallel processing system 1012; an integrated circuit capable of at least a portion of the capabilities of both the central processor 1002; the parallel processing system 1012; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1000 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1012 includes a plurality of PPUs 1014 and associated memories 1016. In an embodiment, the PPUs are connected to a host processor or other peripheral devices via an interconnect 1018 and a switch 1020 or multiplexer. In an embodiment, the parallel processing system 1012 distributes computational tasks across the PPUs 1014 which can be parallelizable for example, as part of the distribution of computational tasks across multiple GPU thread blocks. In an embodiment, memory is shared and accessible (e.g., for read and/or write access) across some or all of the PPUs 1014, although such shared memory may incur performance penalties relative to the use of local memory and registers resident to a PPU. In an embodiment, the operation of the PPUs 1014 is synchronized through the use of a command such as__sync threads( ) which requires all threads in a block (e.g., executed across multiple PPUs 1014) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A processor, comprising:
one or more circuits to cause one or more same transformations of one or more objects within one or more images to be applied to one or more corresponding segmentations of the one or more objects to update one or more neural networks based on a set of differentiable loss functions that encode constraints on how to generate one or more segmentations of one or more objects in an image.

2. The processor of claim 1, wherein the one or more neural networks are to generate one or more segmentations of the one or more same transformations of the one or more objects within the one or more images.

3. The processor of claim 2, wherein the one or more neural networks are trained in an unsupervised manner based, at least in part, on the one or more corresponding segmentations of the one or more objects and the one or more segmentations of the one or more same transformations.

4. The processor of claim 1, wherein the one or more same transformations comprise one or more spatial transformations.

5. The processor of claim 1, wherein the one or more neural networks are trained on a set of images without requiring ground truth data indicating whether a segmentation has correctly been identified.

6. The processor of claim 1, wherein the one or more same transformations of the one or more objects within the one or more images are applied to the one or more corresponding segmentations of the one or more objects in a same order.

7. A system, comprising:
one or more processors to cause one or more same transformations of one or more objects within one or more images to be applied to one or more corresponding segmentations of the one or more objects to update one or more neural networks based on a set of loss functions that encode constraints on how to generate one or more segmentations of one or more objects in an image.

8. The system of claim 7, wherein the one or more neural networks are to generate one or more segmentations of the one or more same transformations of the one or more objects within the one or more images.

9. The system of claim 8, wherein the one or more neural networks are trained in an unsupervised manner based, at least in part, on the one or more corresponding segmentations of the one or more objects and the one or more segmentations of the one or more same transformations.

10. The system of claim 7, wherein the one or more same transformations comprise one or more spatial transformations.

11. The system of claim 7, wherein the one or more neural networks are trained on a set of images without requiring ground truth data indicating whether a segmentation has correctly been identified.

12. The system of claim 7, wherein the one or more same transformations of the one or more objects within the one or more images are applied to the one or more corresponding segmentations of the one or more objects in a same order.

13. A method, comprising:
causing one or more same transformations of one or more objects within one or more images to be applied to one or more corresponding segmentations of the one or more objects to update one or more neural networks based on a set of loss functions that encode constraints on how to generate one or more segmentations of one or more objects in an image.

14. The method of claim 13, wherein the one or more neural networks are to generate one or more segmentations of the one or more same transformations of the one or more objects within the one or more images.

15. The method of claim 14, further comprising comparing the one or more corresponding segmentations of the one or more objects to the one or more segmentations of the one or more same transformations.

16. The method of claim 13, wherein the one or more neural networks are trained on a set of images without requiring ground truth data indicating a correctly identified segmentation.

17. The method of claim 13, wherein the one or more same transformations of the one or more objects within the one or more images are applied to the one or more corresponding segmentations of the one or more objects in a same order.

\* \* \* \* \*